United States Patent
Junk et al.

(10) Patent No.: US 7,609,056 B2
(45) Date of Patent: Oct. 27, 2009

(54) APPARATUS TO DETERMINE THE POSITION OF AN ACTUATOR

(75) Inventors: Kenneth William Junk, Marshalltown, IA (US); Michel Ken Lovell, Marshalltown, IA (US); Ronald Francis Hurd, Marshalltown, IA (US); Steven B. Paullus, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 46 days.

(21) Appl. No.: 11/518,784

(22) Filed: Sep. 11, 2006

(65) Prior Publication Data

US 2008/0061769 A1 Mar. 13, 2008

(51) Int. Cl.
*G01B 7/14* (2006.01)
*G01B 7/30* (2006.01)
*F16K 37/00* (2006.01)

(52) U.S. Cl. ............................ 324/207.25; 324/207.24; 137/553

(58) Field of Classification Search .............. 324/207.2, 324/207.21, 207.24, 207.25; 137/553, 554, 137/556, 557, 558
See application file for complete search history.

(56) References Cited

U.S. PATENT DOCUMENTS

| 6,382,226 | B1 | 5/2002 | Larson et al. |
| 6,695,282 | B2 * | 2/2004 | Clemens et al. ........ 251/129.04 |
| 6,896,407 | B2 * | 5/2005 | Nomiyama et al. ......... 374/142 |
| 6,909,281 | B2 | 6/2005 | Gassman et al. |
| 7,005,847 | B2 | 2/2006 | Gassman et al. |
| 7,088,096 | B2 * | 8/2006 | Etherington et al. ... 324/207.24 |
| 2002/0118011 | A1 * | 8/2002 | Wolf ....................... 324/207.2 |
| 2004/0004473 | A1 | 1/2004 | Gassman et al. |

FOREIGN PATENT DOCUMENTS

| DE | 10360434 | 7/2005 |
| WO | 0175344 | 10/2001 |
| WO | 2004072475 | 8/2004 |

OTHER PUBLICATIONS

Fisher Product Bulletin, 3582 Series Pneumatic and Type 3582i Electro-Pneumatic Valve Positioners, published on web at http://www.emersonprocess/fisher/products/index.html in Feb. 2001.*
Fisher Product Bulletin, TYPE 3660 and 3661 Positioners, published on the web at http://www.emersonprocess.com/fisher/products/index.html in Apr. 2005.*
Patent Cooperation Treaty, "International Search Report," issued by the International Searching Authority in connection with counterpart PCT application No. PCT/US2007/077218, mailed Mar. 12, 2008 (4 pages).
Patent Cooperation Treaty, "Written Opinion of the International Searching Authority," issued by the International Searching Authority in connection with counterpart PCT application No. PCT/US2007/077218, mailed Mar. 12, 2008 (6 pages).

* cited by examiner

*Primary Examiner*—Kenneth J Whittington
(74) *Attorney, Agent, or Firm*—Hanley, Flight & Zimmerman, LLC

(57) ABSTRACT

Apparatus to determine the position of a movable member of an actuator operating a valve assembly are disclosed. The movable member of the actuator displaces an actuation arm of a position sensor such that relative displacement occurs between a magnetic flux source and a magnetic flux sensor of the position sensor.

25 Claims, 7 Drawing Sheets

APPARATUS TO DETERMINE THE POSITION OF AN ACTUATOR

FIELD OF THE DISCLOSURE

This disclosure relates generally to apparatus to determine the position of an actuator and, more particularly, to apparatus to determine the position of a movable member of an actuator operating a valve assembly.

BACKGROUND

Industrial processing plants use control valves in a wide variety of applications such as, for example, controlling product flow in a food processing plant, maintaining fluid levels in large tank farms, etc. Automated control valves are used to manage the product flow or to maintain the fluid levels by functioning like a variable passage. The amount of fluid flowing through a valve body of the automated control valve can be accurately controlled by precise movement of a valve member (e.g., a plug). The control valve or its valve member may be accurately controlled via an actuator and a remotely operated instrument or valve controller, which communicates with a process control computer or unit to receive commands from the process control unit and position the valve member to change the fluid flow through the control valve. Typically, a position sensor within the control valve facilitates accurate positioning of the valve member and, thus, accurate process control.

When the process control computer issues a command to change the flow through the control valve, the valve controller typically determines the present position of the valve member and applies appropriate corrective action via the actuator to position the valve member as commanded by the process control computer. Some actuators are driven by a pressurized air source, which is controlled by the valve controller. For example, in a spring and diaphragm actuator operating a sliding-stem valve, variations in air pressure applied to a large diaphragm displace the diaphragm and the valve member, which is coupled to the diaphragm. Thus, by changing the air pressure applied to the diaphragm, the valve controller can modify the position of the valve member and control fluid flow through the control valve. To properly control the fluid flow, the valve controller typically monitors the current position of the valve member and the position to which the valve member must be displaced in response to a new command signal. A position sensor is typically disposed between the valve controller and the actuator stem of the sliding-stem valve. The output of the position sensor may be communicated directly to the valve controller to provide stem position data for control of the valve member.

Some known position sensors, such as potentiometers, require dynamic or moving mechanical linkages to communicate movement of the valve member to the position sensor. However, manufacturers have developed non-contacting position sensors to improve sensor reliability. One type of non-contacting position sensor is a magnetic position sensor. Magnetic position sensors detect movement or displacement between two members by attaching a magnetic flux source, typically a magnet, to a first member and a sensor, such as a Hall Effect sensor, to a second member. The magnetic flux source provides a magnetic field that is detected by the sensor. Movement by one or both of the first and second members produces relative displacement to cause a different portion of the magnetic field to be detected by the sensor, thereby changing the output of the sensor. This output can be related directly to the relative displacement between the actuator and the valve stem.

Non-contacting position sensors are adaptable and can measure various forms of displacement. However, replacing a mechanical linkage position sensor with a non-contacting position sensor may be limited by the method of attaching the non-contacting position sensor to the actuator, and by the number of magnets required for the amount of displacement to be measured. For example, a non-contacting position sensor may require the development of a different mounting bracket or a housing for each type of actuator to which the non-contacting position sensor is to be attached.

FIG. 1 is a partially cut-away schematic illustration of a known mechanical linkage position sensor 10 mounted on an end-mount rotary actuator 60. The position sensor 10 includes a feedback arm assembly 12 having a feedback arm 14, a roller 15, an axle 16, a feedback arm torsion spring 17, a spring connector arm 18, a bias spring 19, an extension arm 20 having a slot 22, and a sensor assembly 30. The sensor assembly 30 includes an arm 32 connected to a potentiometer 34 and to the bias spring 19, and a pin 36 extending from the arm 32 and received in the slot 22. The position sensor 10 is contained in a housing 40 that includes a mounting adapter 42 and a mounting bracket 44. The mounting bracket 44 has an axle housing 46 that extends laterally to receive rotatably the axle 16. Additionally, valve controller 50 is mounted to the mounting bracket 44 of the housing 40.

The rotary actuator 60 includes a rotatable actuator shaft 62 displaceable by a movable valve stem 64. The rotatable actuator shaft 62 includes a sloped surface cam member 66 engaged by the roller 15 of the position sensor 10. A valve member (not-shown) is operated by the rotatable actuator shaft 62 to control flow through the valve member.

During the operation of the rotary actuator 60 illustrated in FIG. 1, a command signal from a process control computer or unit (not shown) is communicated to the valve controller 50, which operates the rotary actuator 60. The operation of the rotary actuator 60 causes the movable valve stem 64 to move downwardly to rotate the rotatable actuator shaft 62, sloped surface cam member 66, and the valve member (not shown). The roller 15 and the feedback arm 14 pivot about the axle 16 such that the extension arm 20 and the slot 22 cause the pin 36 and the arm 32 to move and operate the potentiometer 34. The potentiometer 34 communicates an electrical signal (e.g., a changing resistance value) to the valve controller 50. The electrical signal is related to the position of the rotatable actuator shaft 62 and the valve member so that the process control computer can determine the position of the valve member and apply any appropriate corrective action or a new command signal through the valve controller 50 and the rotary actuator 60.

When used in end-mount rotary actuators or remote mount feedback units, the mechanical linkage of the position sensor 10 illustrated in FIG. 1 may be subjected to rugged service conditions. The bias spring 19 exerts considerable force on the arm 32 and the pin 36, whereby during rugged service conditions it is possible for the pin 36 to be sheared off by the extension arm 20. Likewise, other wear points can develop within the mechanical linkage of the position sensor 10 and cause the movable valve stem 64 to become disconnected from the valve controller 50.

Long displacement or long-stroke actuators tend to have parts that rotate and vibrate more than the parts of short-stroke actuators and, thus, present alignment and vibration problems for non-contacting position sensors. A known non-contacting position sensor for a short-stroke actuator requires a large number of magnets in the array of magnets. The use of a non-contacting position sensor configured for a short-stroke actuator with a long-stroke actuator, or an end mount rotary actuator, or a remote mount feedback unit, may require a relatively large number of magnets to measure displacement. A non-contacting position sensor having such a relatively large number of magnets may be expensive and may require long lead times to manufacture.

FIG. 2 is a partial cut-away, schematic illustration of a known position sensor 80 mounted on a portion of a long-stroke sliding-stem actuator 70. The sliding-stem actuator 70 includes a movable valve stem 74 having a ramped or sloped surface cam member 76. A valve member (not shown) is operated by the movable valve stem 74 to control flow through the valve member. The ramped or sloped surface cam member 76 is slidably engaged by a roller 85 mounted on a feedback arm 86, which is pivotally coupled to an axle 88 of the position sensor 80. The position sensor 80 includes a mechanical linkage assembly and potentiometer similar to the linkage assembly and the potentiometer of the position sensor 10 illustrated in FIG. 1, and thus need not be described in further detail herein. The position sensor 80 is held by a mounting bracket 90 to which a valve controller 95 is attached.

The long-stroke sliding-stem actuator 70 and the position sensor 80 operate similar to the operation described above in connection with the rotary actuator 60 and the position sensor 10 illustrated in FIG. 1. A command signal from a process control computer (not shown) is communicated to the valve controller 95, which operates the actuator 70. The operation of the actuator 70 causes the movable valve stem 74 to move downwardly to operate the valve member and to displace the ramped or sloped surface cam member 76. In response to the movement of the ramped or sloped surface cam member 76, the roller 85 and the feedback arm 86 pivot about the axle 88 to operate the position sensor 80. The position sensor 80 communicates an electrical signal to the valve controller 95, which communicates with the process control computer. In this manner, the electrical signal is related to the position of the movable valve stem 74 and the valve member so that the process control computer can determine the position of the valve member and apply any appropriate corrective action or a new command signal through the valve controller 95 and the long-stroke sliding-stem actuator 70.

The use of a known non-contacting position sensor in place of a mechanical linkage position sensor in a long-stroke actuator such as, for example, the position sensor 80 of the example long-stroke sliding-stem actuator 70, would require substantial redesign and development to resolve scale-up issues. For example, the large rotational forces imposed by long-stroke actuators to their structural members tend to break off a sensing fork of a directly connected non-contacting position sensor. Also, a large number of magnets can be required to measure the stroke of a long-stroke actuator (typically four magnets per inch of stroke). Thus, new magnet arrays would have to be developed for actuators having strokes as long as twelve to twenty-four inches in length. Additionally, new mounting adapters and plates would have to be designed to enable the non-contacting position sensor to be mounted to an actuator.

SUMMARY

A position sensor of an actuator operated valve assembly includes a housing to support one of a sensor and a magnetic flux source to detect variations in a magnetic field resulting from relative displacement between the sensor and the magnetic flux source. A rotatable actuation arm supports the other of the sensor and the magnetic flux source, and a rotatable coupling is between the rotatable actuation arm and the housing, to enable the relative displacement between the sensor and the magnetic flux source. The rotatable actuation arm is configured to support one of a surface at a slope and an engagement part to movably engage the other of the surface at a slope and the engagement part supported by a movable member of an actuator of the actuator operated valve assembly.

DETAILED DESCRIPTION

In general, the example apparatus to determine the position of an actuator described herein may be utilized for sensing or measuring displacement in various types of actuators. Additionally, while the examples described herein are described in connection with the control of product flow for the industrial processing industry, the examples described herein may be more generally applicable to a variety of process control operations for different purposes.

Figure 3:
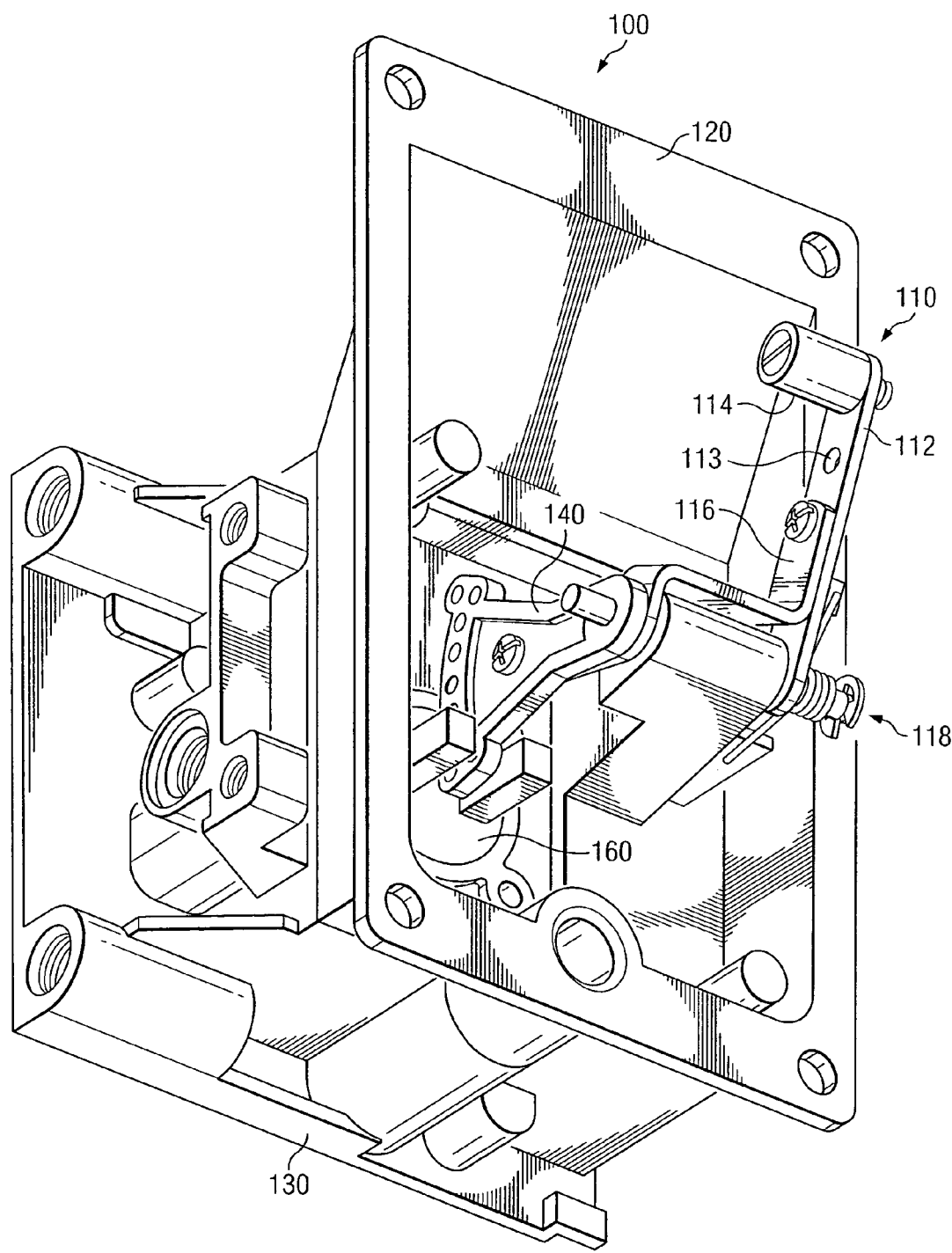
FIG. 3 is an illustration of an example position sensor.

FIG. 3 is an illustration of an example position sensor 100. The example position sensor 100 includes an arm assembly 110, a mounting bracket 120, a controller housing 130 and a sensor 160. The controller housing 130 is attached to the mounting bracket 120. As can be readily seen in FIG. 3, the arm assembly 110 includes an actuation arm 112 having an opening 113 and an engagement part or roller 114, an alignment arm 116, an axle assembly 118, and a magnet array holder 140.

Figure 4:
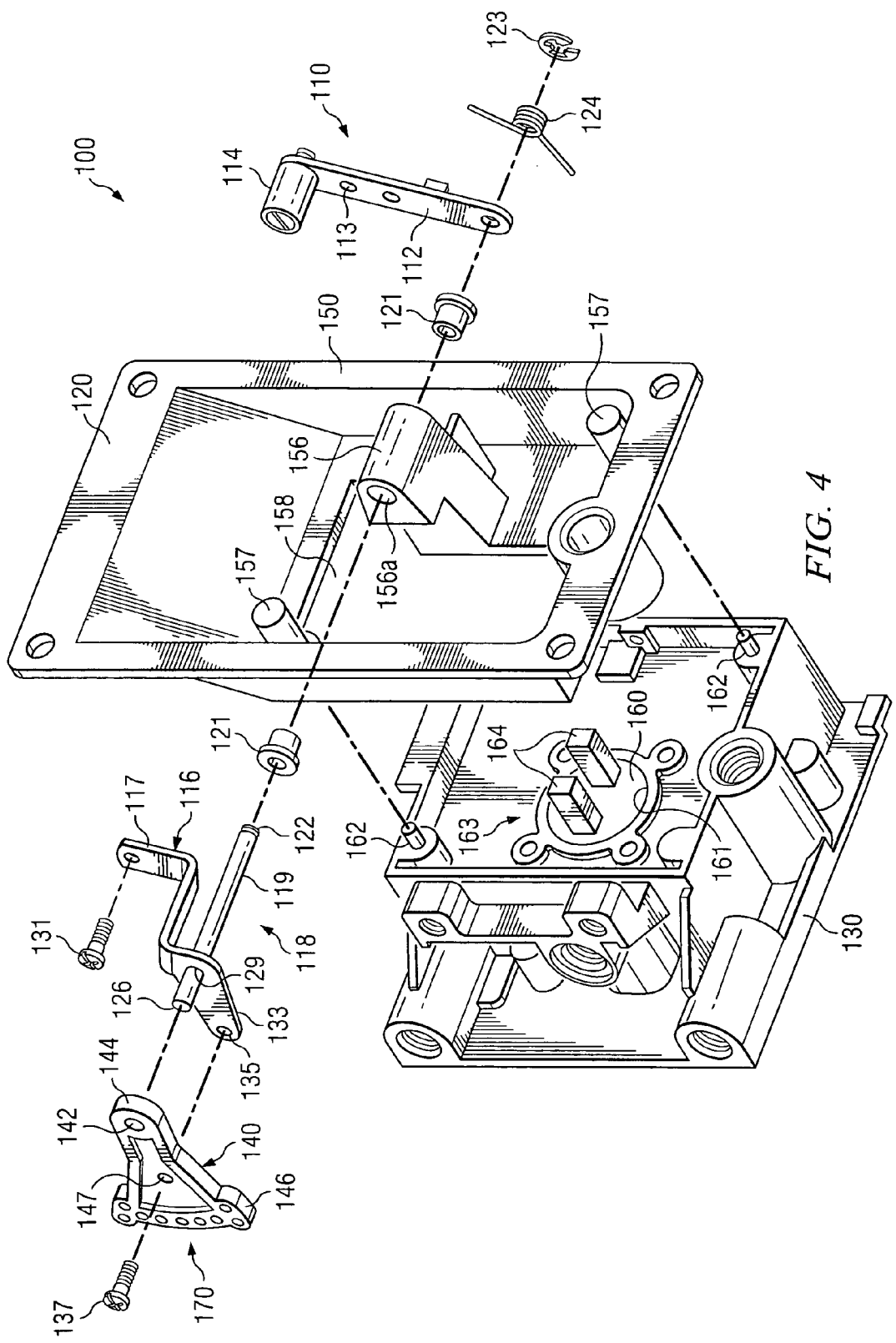
FIG. 4 is an exploded view of the example position sensor of FIG. 3.

FIG. 4 is an exploded view of the example position sensor 100 of FIG. 3. The arm assembly 110 has the roller 114 attached at the distal end of the actuation arm 112 but can also be attached at the opening 113 if the amount of rotation of the actuation arm 112 is to be changed to enable the example position sensor 100 to be used with a different size or type of actuator. The axle assembly 118 includes an axle 119 that, when assembled, is welded to the actuation arm 112, and a pair of bearings 121. Axle end 122 includes a snap ring 123 to retain a torsion spring 124 on the axle 119. An axle end 126 extends through an opening 129 in the alignment arm 116.

The alignment arm 116 includes an angled end 117 attached securely by a screw 131 to the actuation arm 112. A flange end 133 of the alignment arm 116 includes the opening 129 through which extends the axle end 126 to position the flange end 133 at the actuation arm 112. The flange end 133 of the alignment arm 116 also includes a threaded opening 135 to receive a screw 137.

In FIG. 4, the example magnet array holder 140 is sector-shaped and has an opening 142 in a narrow sector end 144 to receive the axle end 126, and a larger sector end 146 has an opening 147 to receive the screw 137. The sector-shaped magnet array holder 140 is secured to and held in alignment with the flange end 133 of the alignment arm 116 by the reception of the axle end 126 in the opening 142 and the reception of the screw 137 in the openings 147 and 135.

Figure 4A:
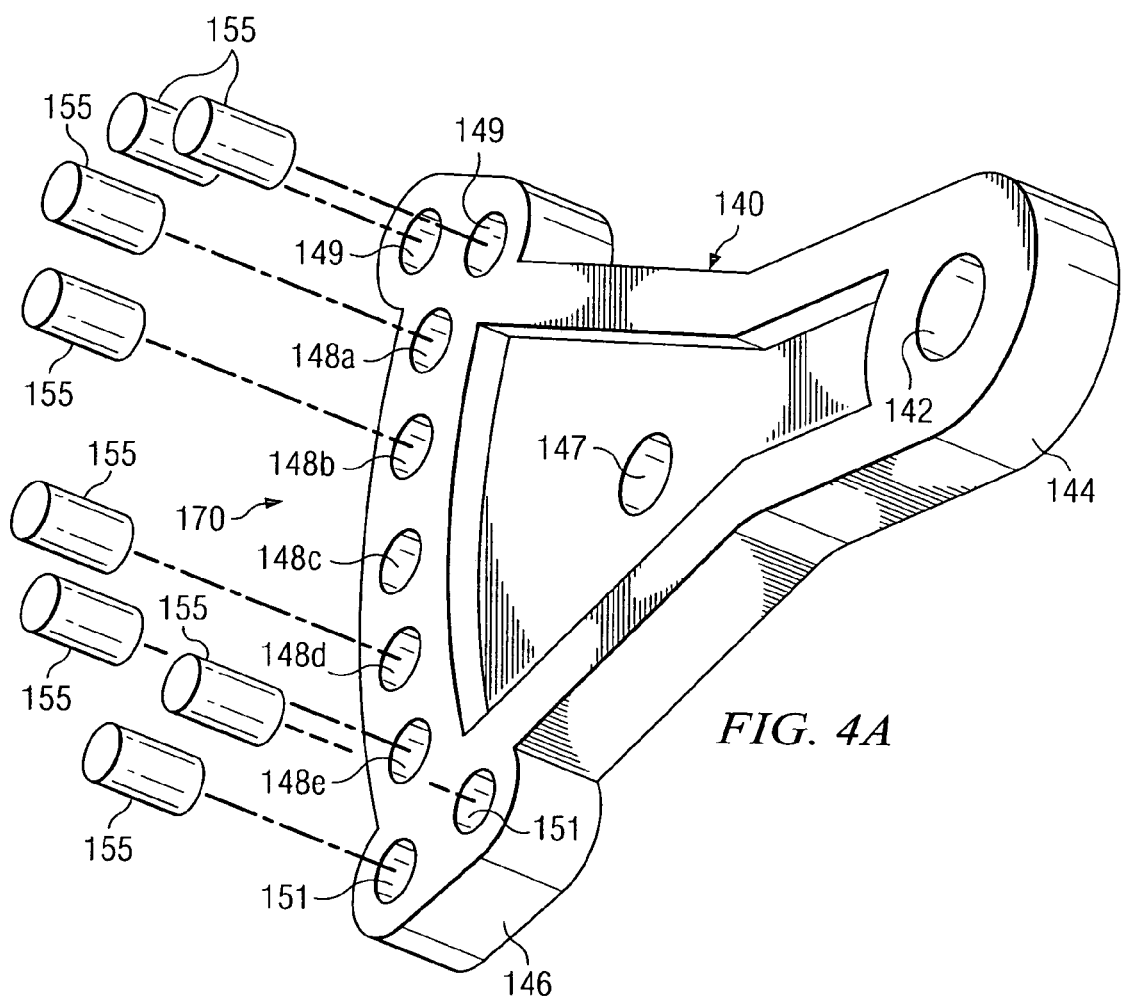
FIG. 4A is a further exploded view of an example magnet array holder of the example position sensor in FIG. 4.

Referring now to FIG. 4A, at the larger sector end 146 the magnet array holder 140 has a plurality of openings 148*a-e* located between double openings 149 and 151. Each of the openings 148*a*, 148*b*, 148*d* and 148*e* has fixed therein a cylindrically-shaped discrete magnet 155. Each of the openings of the double openings 149 and 151 has a discrete magnet 155 located therein. The opening 148*c* does not contain a magnet. Thus, the example sector-shaped magnet array holder 140 carries eight magnets 155, which create a rotary flux source 170. Of course, other numbers of magnets and array holders of other shapes may be used to create a suitable flux source such as the rotary flux source 170.

The magnets 155 in the openings 149, 148*a* and 148*b* located above the opening 148*c* are arranged so that the flux source 170 changes induction from a high value to a low value as the magnet array holder 140 rotates from the double opening 149 to the opening 148*b*. The induction at the opening 148*c* is zero due to the absence of a magnet. In a similar manner, the induction of the flux source 170 increases from a low value to a high value as the magnet array holder 140 rotates from the opening 148*d* to the double opening 151. Thus, both the amount and the direction of rotation of the magnet array holder 140 relative to the opening 148*c* can be determined from signals communicated by the position sensor 100.

Returning to FIG. 4, the mounting bracket 120 includes an outer flange 150, a laterally extending axle housing 156 with an opening 156*a*, receptacles 157, and a central opening 158. Although a plurality of holes are shown in the outer flange 150 to facilitate the attachment of the bracket 120 by way of screws or bolts to an actuator (not shown), the bracket 120 may be attached to an actuator by numerous other securing methods such as welding, releasable clips, hinge and lock, adhesive, etc. Although not viewable, the receptacles 157 each have in their opposite side a threaded opening.

The controller housing 130 may contain a valve controller (not shown). The housing 130 includes screws 162 aligned for reception in the not-shown threaded openings in the receptacles 157 of the mounting bracket 150. The sensor 160 is mounted in an opening 161 in a portion of the housing 130. The sensor 160 has a U-shaped flux-gathering pole piece 163 with forks 164. Referring to FIGS. 3, 4 and 4A, the position sensor 100 has a null position, which occurs when the opening 148*c* of the magnet array holder 140 is located between the forks 164 of the pole piece 163. Although the position sensor 100 of FIGS. 3, 4 and 4A is illustrated as a Hall Effect type of sensor, it is contemplated that other types of magnetic flux sensors, such as magneto-resistive, giant magneto-resistive bridge, or flux gate, may be utilized in the position sensor 100.

Referring again to FIG. 4, the controller housing 130 is attached to the mounting bracket 120 by threading the screws 162 into the threaded openings of the receptacles 157. When the controller housing 130 is attached to the mounting bracket 120, the sensor 160 is received within the opening 158 in the bracket 150. Of course, other securing methods may be used to attach the controller housing 130 to the mounting bracket 120.

Referring to FIG. 3, the position sensor 100, the mounting bracket 120, and the controller housing 130 are shown assembled for operation. The controller housing 130 has been attached to the mounting bracket 120. The axle 119 and the bearings 121 of the axle assembly 110 are received rotatably in the opening 156*a* of the laterally extending axle housing 156 (see FIG. 4). The sector-shaped magnet array holder 140 is attached to the alignment arm 116 of the arm assembly 110. The controller housing 130 positions the U-shaped flux-gathering pole piece 163 (FIG. 4) of the sensor 160 perpendicular to the axis of rotation of the axle 119, which is received rotatably in the opening 156*a* of the axle housing 156. In one example, the rotatable flux source 170 is positioned to rotate about thirty degrees between the forks 164 of the pole piece 163.

Figure 1:
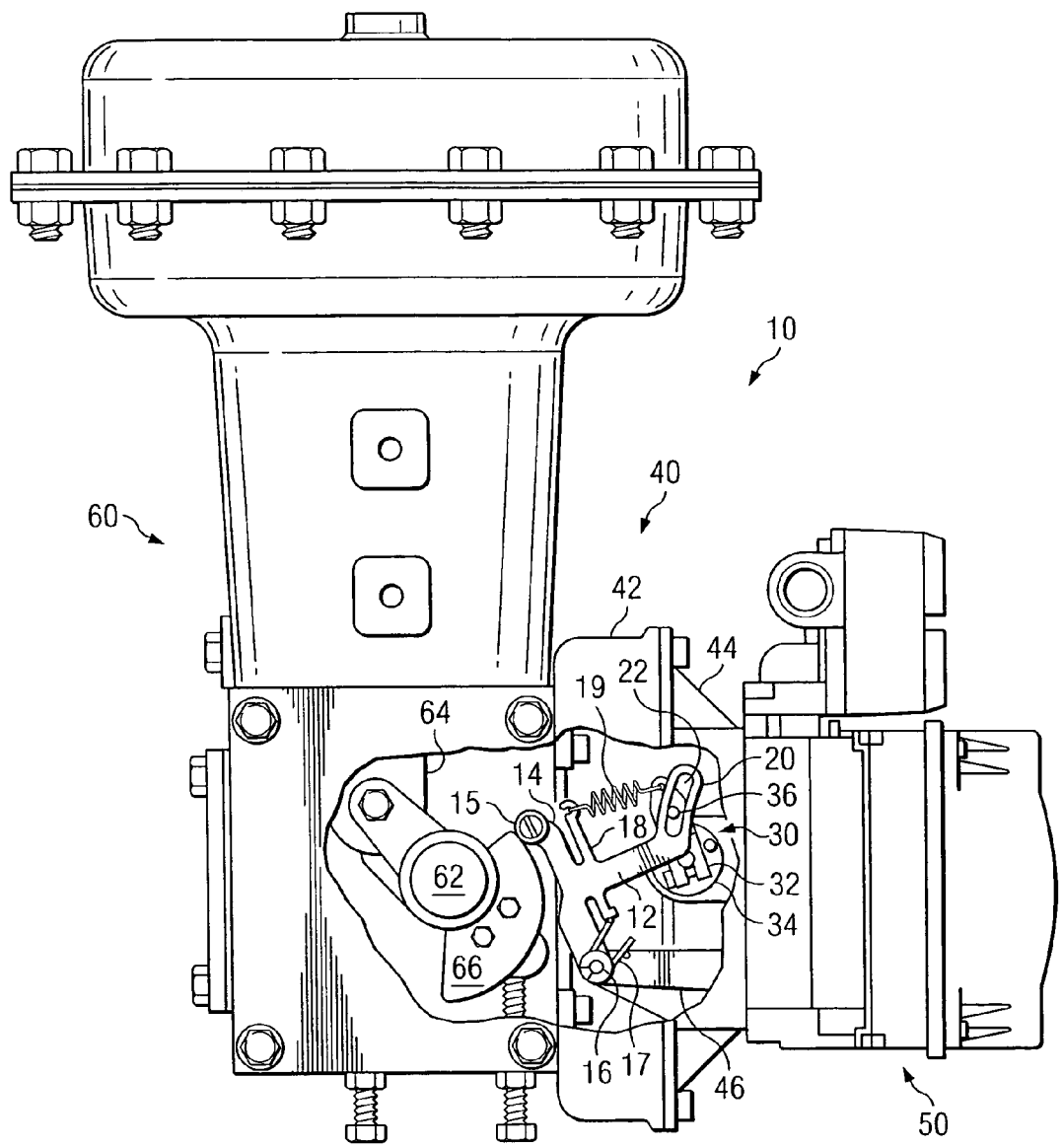
FIG. 1 is a partially cut-away schematic illustration of a known position sensor mounted on an end-mount rotary actuator.
Figure 2:
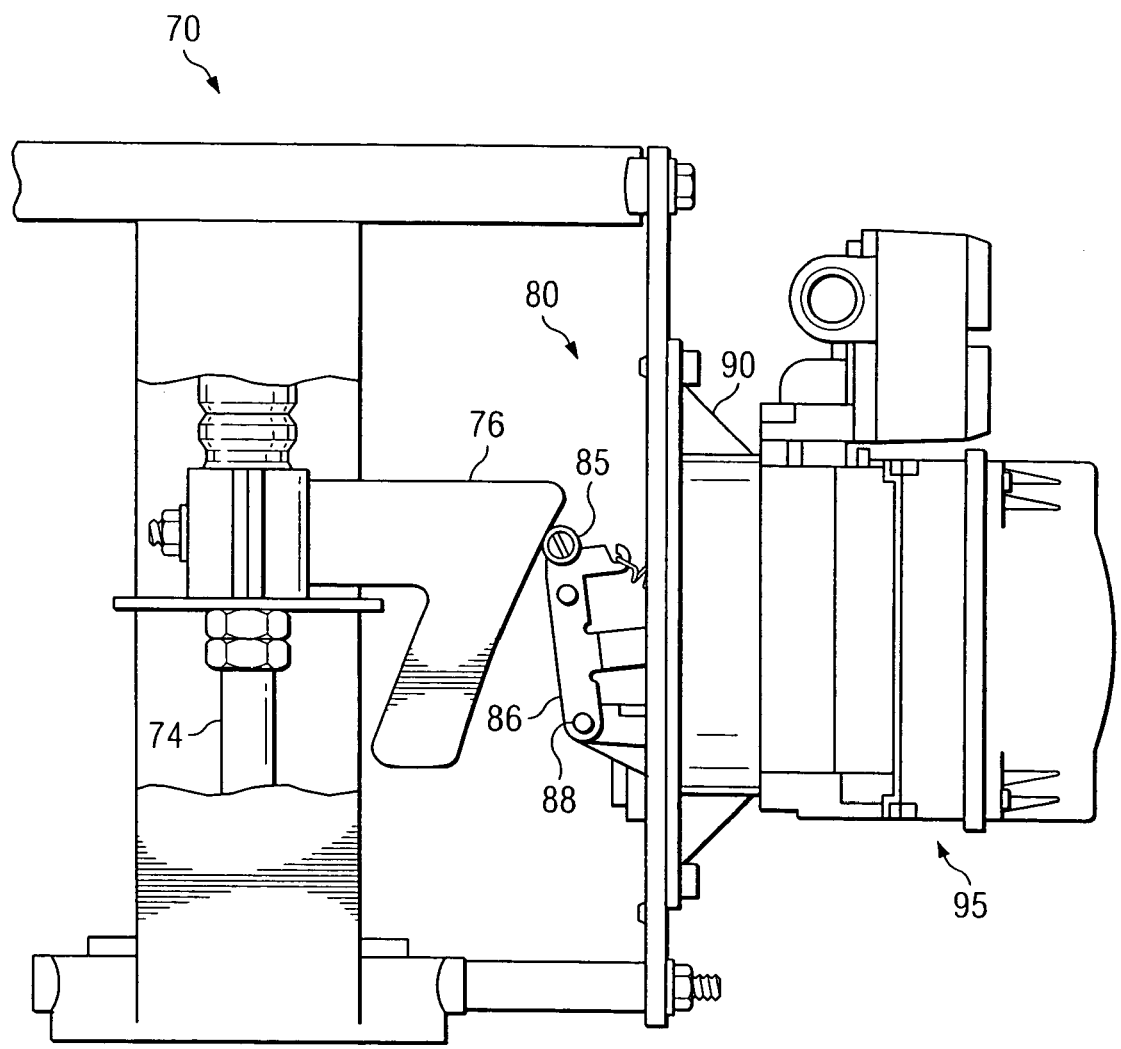
FIG. 2 is a partially cut-away schematic illustration of a known position sensor mounted on a long-stroke sliding-stem actuator.

The position sensor 100 is operated by movable engagement of the engagement part or the roller 114 of the arm assembly 110 with a surface at a slope on a movable member of an actuator such as, for example, the sloped surface cam member 66 of the movable valve stem 64 in FIG. 1, or the ramped or sloped surface cam member 76 of the movable valve stem 74 in FIG. 2. The roller 114 is not fixedly positioned relative to the movable member such as the sloped surface cam member 66 or the ramped or sloped surface cam member 76. The movable engagement between the roller 114 and the movable member of an actuator may include any kind of engagement so that movement is accomplished between parts non-fixedly engaging one another such as, for example, by rolling, sliding, bearing, deflection, etc. Although in FIG. 3 the roller 114 is shown attached to the same side of the actuation arm 112 as the alignment arm 116, the roller 114 can be attached to the opposite side of the actuation arm 112 to accommodate engagement with a movable member of another actuator.

As the roller 114 and the arm assembly 110 are displaced by the displacement of the movable member of the actuator, the arm assembly 110, the axle assembly 118 and the magnet array holder 140 rotate relative to the axle housing 156. Each discrete magnet 155 of the flux source 170 has a different field strength to provide a predetermined amount of magnetic energy or induction. The position sensor 100 provides a linear relationship between the rotary travel of the magnet array holder 140 and the output of the sensor 160, which is communicated as an electrical signal to the valve controller (not shown) at the controller housing 130. The not-shown valve controller communicates with a process control computer (not shown), which determines the position of a valve member operated by the actuator. The process control computer can apply any appropriate corrective action or a new command signal to the valve controller and the actuator to change the position of the valve member.

Referring to FIG. 4A, the two magnets 155 located in each of the double openings 149 and 151 provide an end point effect for the position sensor 100. When the example magnet array holder 140 is rotated approximately fifteen degrees in either direction from the null position, the example position sensor 100 senses a significant change in induction of the magnets 155 at one of the double openings 149 or 151. The example position sensor 100 communicates with the valve controller and the process control computer. The process control computer recognizes the significant change in induction of the flux source 170 as indicating that the position sensor 100 is at an end point of rotation (e.g., the magnets 155 in either of the double openings 149 or 151 are located between the forks 164 of the pole piece 163), which corresponds to an end point in the displacement of the valve member. By using two magnets 155 at the end points of the rotation of the magnet array holder 140 (i.e., at the double openings 149 and 151) to provide a significant change in induction or field strength, the number of magnets required for the position sensor 100 is reduced. A position sensor using single magnets aligned in a row provides a more gradual change in induction and would require a significantly greater number of magnets.

Figure 5:
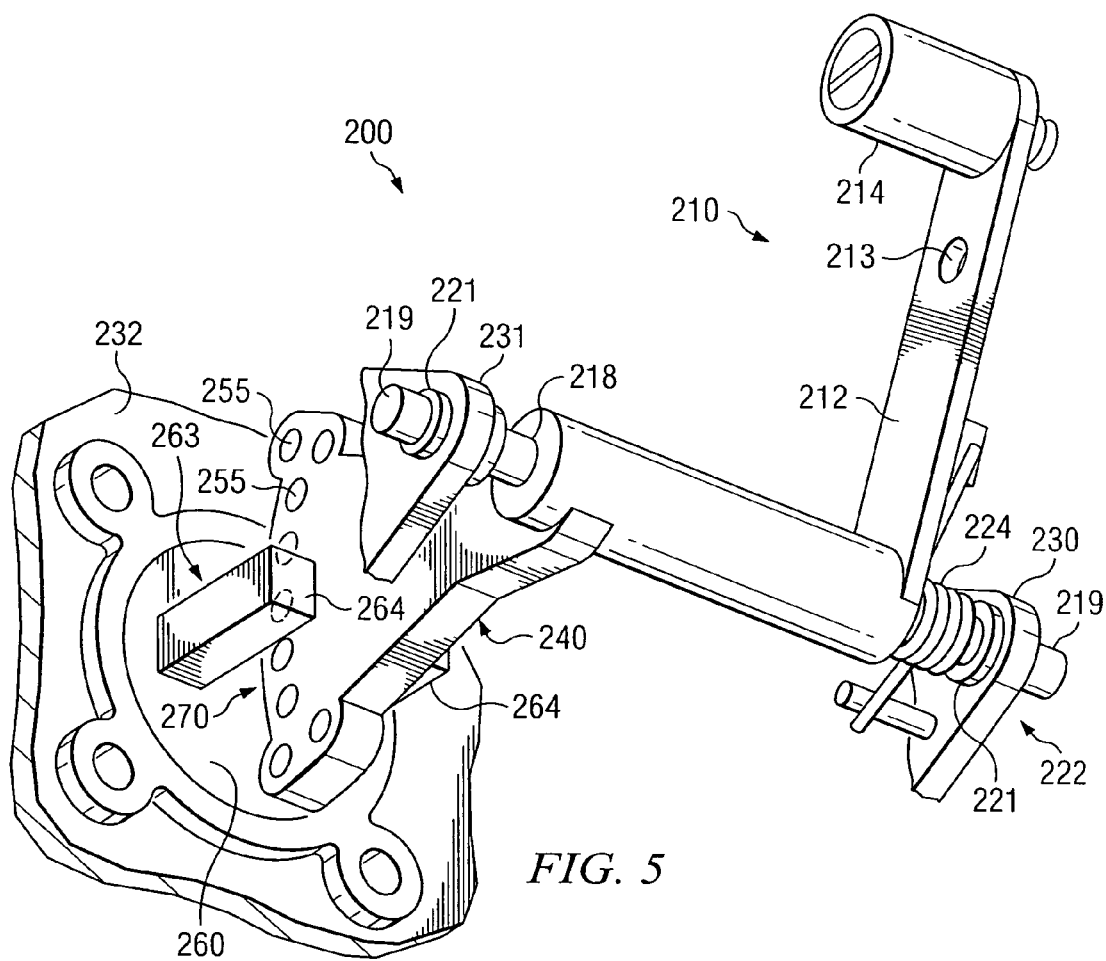
FIG. 5 is an illustration of an arm assembly and a magnet array of another example position sensor.

FIG. 5 is an illustration of an arm assembly and a magnet array of another example position sensor 200. The example position sensor 200 provides an alternative configuration for mounting an arm assembly 210 and a rotatable magnet array holder 240. The example position sensor 200 includes the arm assembly 210, an axle 218, a controller housing 230, the magnet array holder 240, and discrete magnets 255.

The arm assembly 210 includes an actuation arm 212 having an opening 213 and an engagement part or roller 214, and is fixed to the axle 218. The axle 218 includes a pair of axle extensions 219 having bearings 221. The axle 218 is fixed to the rotatable magnet array holder 240 aligned with a sensor 260. The discrete magnets 255 of the rotatable magnet holder 240 provide a rotary flux source 270. An axle end 222 includes a torsion spring 224 on the axle extension 219. A pair of stationary extensions 230 and 231 each have an opening (not shown) receiving a respective one of the bearings 221 on a respective one of the axle extensions 219. The stationary extensions 230 and 231 may be part of the controller housing 232 or a housing mounting bracket (not shown), or any other type of stationary housing member suitable for supporting the stationary extensions 230 and 231. The magnet array holder 240 is positioned between forks 264 of a U-shaped flux-gathering pole piece 263 of the sensor 260.

As described above for the position sensor 100 in FIG. 3, the position sensor 200 in FIG. 5 operates similarly by a movable engagement of the roller 214 of the arm assembly 210 with a movable member of an actuator. As the arm assembly 210 and the axle 218 rotate relative to the stationary extensions 230 and 231, the magnet array holder 240 and the discrete magnets 255 rotate relative to the sensor 260. The flux source 270 changes as the discrete magnets 255 rotate to cause the sensor 260 to communicate an electrical signal to a valve controller (not shown).

Figure 6:
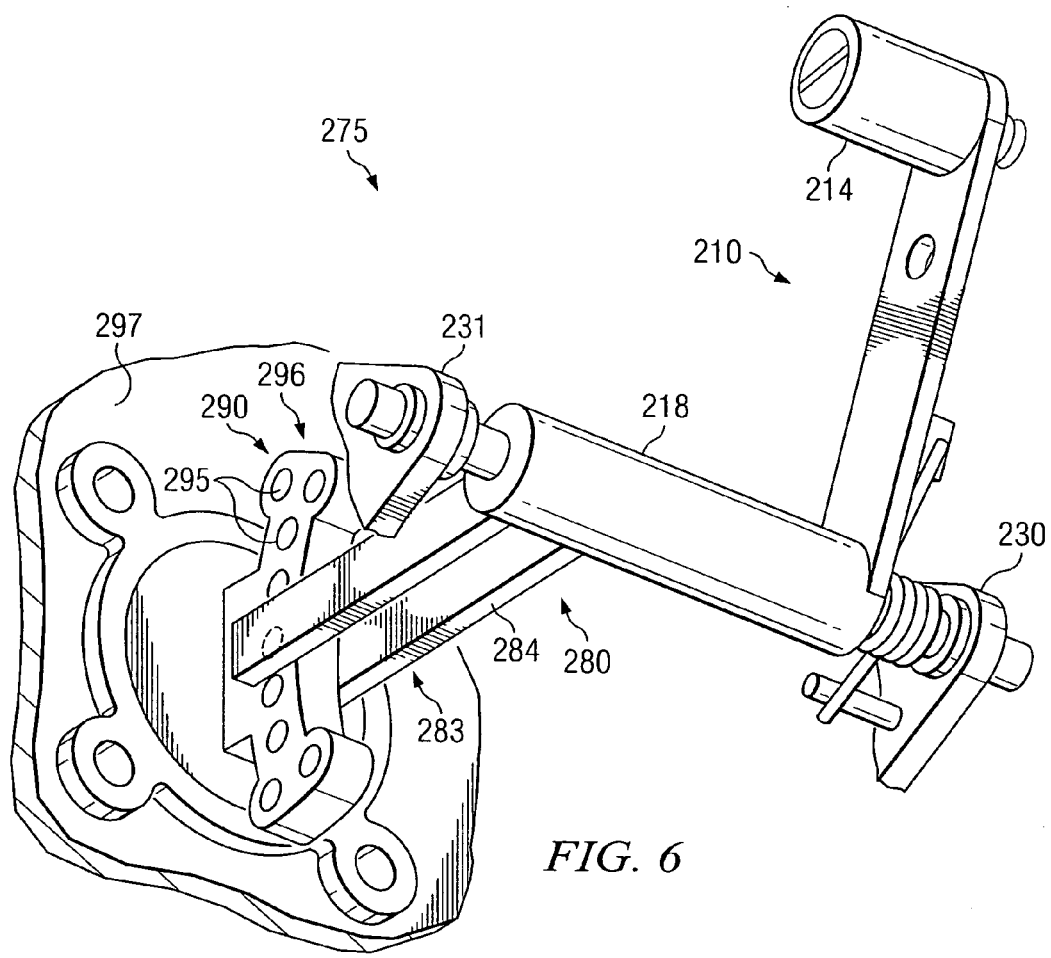
FIG. 6 is an illustration of an arm assembly, sensor and magnet array holder of another example position sensor.

FIG. 6 is an illustration of an arm assembly, sensor and magnet array holder of another example position sensor 275. The example position sensor 275 is an alternative configuration providing a rotatable sensor 280 and a stationary magnet array holder 290. The example position sensor 275 includes the arm assembly 210, the roller 214, the axle 218, and the stationary extensions 230 and 231 illustrated in FIG. 5. The example position sensor 275 further includes the rotatable sensor 280 fixedly mounted to the axle 218 of the arm assembly 210, and a stationary magnet array holder 290 fixedly mounted to a part of a controller housing 297. The stationary magnet array holder 290 has discrete magnets 295 providing a stationary flux source 296. The stationary magnet array holder 290 is positioned between the forks 284 of a U-shaped flux-gathering pole piece 283 of the rotatable sensor 280.

As described above for the position sensor 200 in FIG. 5, the position sensor 275 in FIG. 6 operates similarly by a movable engagement of the roller 214 of the arm assembly 210 with a movable member of an actuator. As the arm assembly 210 and the axle 218 rotate relative to the stationary extensions 230 and 231, the rotatable sensor 280 rotates relative to the stationary magnet array holder 290 and the discrete magnets 295. The flux source 296 changes as the rotatable sensor 280 rotates to cause the rotatable sensor 280 to communicate an electrical signal to a valve controller (not shown).

Figure 7:
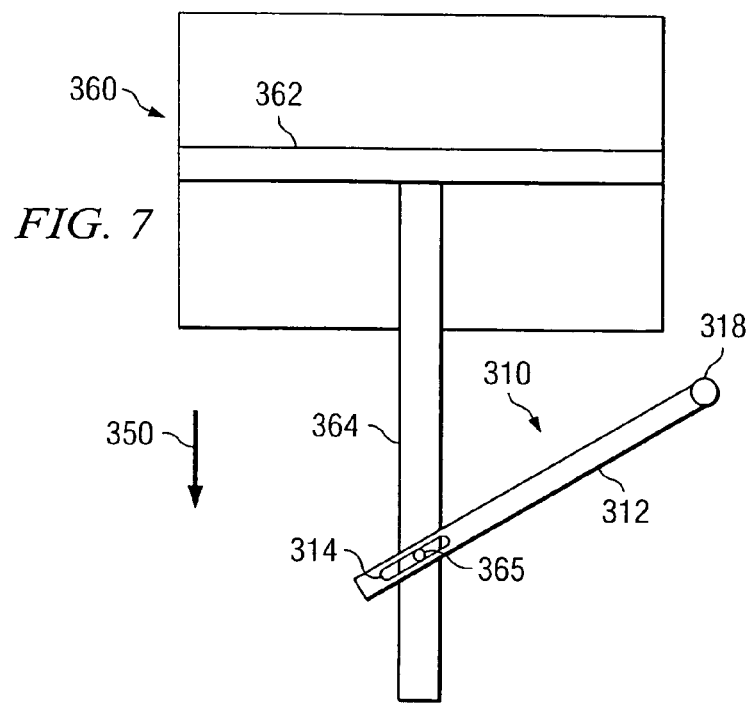
FIG. 7 is a schematic illustration of an alternative coupling between a rotatable arm assembly of a magnetic position sensor and a sliding-stem actuator.

FIG. 7 is a schematic illustration of an alternative arm assembly 310 of a magnetic position sensor (not shown) coupled to a movable valve stem 364 of a sliding-stem actuator 360. The sliding-stem actuator 360 includes a piston 362 attached to the movable valve stem 364, which has an engagement part or pin 365. The arm assembly 310 of the magnetic position sensor includes an actuation arm 312 having a slot or a guide way 314 slidingly receiving the pin 365 to provide a sloped surface at the actuation arm 312.

The actuation arm 312 rotates about a pivot axis 318, and the actuation arm 312 is connected to one of a magnetic flux sensor or a magnetic flux source (not shown) such as, for example, those previously described herein and in FIGS. 3-6, or the actuation arm 312 may be connected by linkage to a single magnet rotary position sensor such as, for example, the rotary position sensor having single magnet flux source disclosed in commonly-owned U.S. Pat. Nos. 6,909,281 B2 and 7,005,847 B2, which are incorporated by reference in their entirety herein. During the operation of the sliding-stem actuator 360, the piston 362 moves downwardly to displace the movable valve stem 364 in the direction of arrow 350. As the pin 365 on the movable valve stem 364 moves downwardly with the stem 364, the pin 365 slides in the guide way 314 and rotates the actuation arm 312 to operate the magnetic position sensor. Although the guide way 314 is illustrated as a through opening, the guide way 314 may be implemented using other sliding or guiding engagements such as, for example, a pin and parallel surfaces, a rotatable pin in a trough or trench, etc.

Although certain example apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A position sensor of an actuator operated valve assembly, comprising:
   a housing to support one of a magnetic flux sensor or a magnetic flux source to detect variations in a magnetic field resulting from relative displacement between the magnetic flux sensor and the magnetic flux source, wherein the magnetic flux source is at least partially disposed between at least two portions of the magnetic flux sensor; and
   a rotatable actuation arm to support the other of the magnetic flux sensor or the magnetic flux source to enable the relative displacement between the magnetic flux sensor and the magnetic flux source, wherein the magnetic flux source includes an arc-shaped portion having at least a pair of discrete magnets at substantially the same angular position at each of the ends of the arc-shaped portion and a plurality of magnets spaced apart relative to each other along the path of travel of the magnetic flux sensor or the magnetic flux source and arranged between the ends of the arc-shaped portion.

2. A position sensor as defined in claim 1, wherein the magnetic flux sensor is supported by the housing proximate the magnetic flux source, and wherein the magnetic flux source is rotatably positioned by the rotatable actuation arm.

3. A position sensor as defined in claim 2, wherein the rotatable actuation arm includes an alignment arm and the magnetic flux source includes a magnetic flux source holder supported by the alignment arm.

4. A position sensor as defined in claim 3, wherein the alignment arm is attached to the actuation arm and includes an opening to receive an axle.

5. A position sensor as defined in claim 1, wherein a mid-portion of the arc-shaped portion does not have a discrete magnet.

6. A position sensor as defined in claim 1, wherein the housing includes an axle mount and the rotatable actuation arm includes an axle to be rotatably received by the axle mount.

7. A position sensor as defined in claim 1, wherein the engagement part is a roller at the rotatable actuation arm and rotatably engages the surface.

8. A position sensor as defined in claim 1, wherein the surface is part of a guide way and the engagement part is a pin to be received in the guide way to rotate the actuation arm.

9. A position sensor as defined in claim 1, wherein the surface is a cam surface of the movable member.

10. A position sensor as defined in claim 9, wherein the cam surface includes at least one of a curved surface or a ramped surface.

11. A position sensor as defined in claim 1, wherein each of the pairs of the discrete magnets at the respective ends of the arc-shaped member are transversely spaced relative to the path of travel of the magnetic flux source or the magnetic flux sensor.

12. A position sensor as defined in claim 1, wherein each pair of discrete magnets is to significantly increase induction to indicate a maximum angular rotatable position of the arc-shaped portion, and wherein each magnet from the plurality of magnets has a different field strength to provide a continuously variable magnetic induction in response to relative displacement between the magnetic flux sensor and the magnetic flux source.

13. A position sensor as defined in claim 1, wherein the rotatable actuation arm having one of a surface at a slope or an engagement part to movably engage the other of the surface at a slope or the engagement part supported by a movable member of an actuator of the actuator operated valve assembly.

14. A position sensor as defined in claim 1, further comprising a rotatable coupling between the rotatable actuation arm and the housing.

15. A position sensor assembly, comprising:
a housing to support one of a magnetic flux sensor or a magnetic flux source to detect variations in a magnetic field resulting from relative displacement between the magnetic flux sensor and the magnetic flux source; and
a rotatable actuation arm coupled to the housing and to support the other of the magnetic flux sensor or the magnetic flux source to enable the relative displacement between the magnetic flux sensor and the magnetic flux source, wherein the magnetic flux source is disposed between two portions of the magnetic flux sensor, and wherein the magnetic flux source includes a first pair of discrete magnets at substantially the same angular position at a first end of the magnetic flux source and transversely spaced relative to a path of travel of the magnetic flux sensor or the magnetic flux source, and a second pair of discrete magnets at substantially the same angular position at a second end of the magnetic flux source and transversely spaced relative to the path of travel of the magnetic flux sensor or the magnetic flux source, and wherein the magnetic flux source includes a plurality of magnets disposed between the first and second pairs of magnets and spaced apart along the path of travel.

16. A position sensor assembly as defined in claim 15, wherein the magnetic flux sensor is supported by the housing proximate the magnetic flux source, and wherein the magnetic flux source is rotatably positioned by the rotatable actuation arm.

17. A position sensor assembly as defined in claim 16, wherein the rotatable actuation arm includes an alignment arm and the magnetic flux source includes a magnetic flux source holder supported by the alignment arm.

18. A position sensor assembly as defined in claim 15, wherein the magnetic flux source comprises an arc-shaped portion.

19. A position sensor assembly as defined in claim 18, wherein a mid-portion of the arc-shaped portion does not have a discrete magnet.

20. A position sensor assembly as defined in claim 15, wherein the rotatable actuation arm includes one of a surface at a slope or an engagement part to movably engage the other of the surface at a slope or the engagement part at a movable member.

21. A position sensor assembly as defined in claim 20, wherein the surface is part of a guide way and the engagement part is a pin to be received in the guide way to rotate the actuation arm.

22. A position sensor, comprising:
a magnetic flux source having an arc-shaped portion that includes a pair of openings at each end of the arc-shaped portion symmetrically disposed relative to an arcuate path of travel of the arc-shaped portion and a plurality of openings spaced along the arcuate path of travel of the arc-shaped portion between the pair of openings;
a plurality of discrete magnets disposed within the plurality of openings, wherein each magnet from the plurality of magnets has a different field strength;
a pair of discrete magnets disposed within each of the pairs of openings, wherein each pair of discrete magnets is to provide a substantially increased induction relative to the plurality of magnets to indicate a maximum travel of the arc-shaped portion, and wherein each of the pairs of discrete magnets at each end of the arc-shaped portion is at substantially the same angular position; and
a magnetic flux sensor to detect variations in a magnetic field resulting from displacement between the magnetic flux sensor and the magnetic flux source, wherein the magnetic flux sensor has a fork-shaped member to form a U-shaped flux gathering pole member, and wherein the magnetic flux source is positioned between the fork-shaped members.

23. A position sensor as defined by claim 22, wherein a mid-portion of the arc-shaped portion does not have a discrete magnet.

24. A position sensor as defined in claim 22, further comprising a housing to support the magnetic flux sensor and a rotatable actuation arm to support the magnetic flux source for rotation to enable the relative displacement between the magnetic flux source and the magnetic flux sensor.

25. A position sensor as defined in claim 22, wherein the plurality of openings are arranged along the path of travel so that the magnetic flux source changes induction from a high value to a low value as the magnetic flux source rotates relative to the magnetic flux sensor from the pair of openings to an opening of the plurality of openings disposed at a mid-section of the arc-shaped member along the path of travel.

* * * * *